(12) United States Patent
Thiagrajan et al.

(10) Patent No.: US 10,630,804 B1
(45) Date of Patent: Apr. 21, 2020

(54) PRIORITY-BASED ARTIFACT ROUTING

(71) Applicant: EMC IP Holding Company LLC, Hopkinton, MA (US)

(72) Inventors: Senthil Thiagrajan, Westborough, MA (US); Vishwadeep Chawla, Hopkinton, MA (US); Venkata Pavan Kumar Duddu, Shrewsbury, MA (US); Lavanya Laxminarayan, Shrewsbury, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 162 days.

(21) Appl. No.: 15/802,917

(22) Filed: Nov. 3, 2017

(51) Int. Cl.
*H04L 29/08* (2006.01)
*G06F 9/48* (2006.01)
*G06F 9/50* (2006.01)
*G06F 9/455* (2018.01)

(52) U.S. Cl.
CPC .......... *H04L 67/306* (2013.01); *G06F 9/4881* (2013.01); *H04L 67/1002* (2013.01); *G06F 9/5072* (2013.01); *G06F 2009/45583* (2013.01)

(58) Field of Classification Search
CPC ....................................................... H04L 67/306
See application file for complete search history.

(56) References Cited

U.S. PATENT DOCUMENTS

2014/0058801 A1* 2/2014 Deodhar ............ G06Q 10/0639
705/7.38
2016/0315926 A1* 10/2016 Agarwal ................. H04L 63/06

* cited by examiner

*Primary Examiner* — Adnan M Mirza
(74) *Attorney, Agent, or Firm* — Ryan, Mason & Lewis, LLP

(57) ABSTRACT

An apparatus in one embodiment comprises a processing platform that includes a plurality of processing devices each comprising a processor coupled to a memory. The processing platform is configured to implement at least a portion of at least a first cloud-based system. The platform further comprises an artifact priority attribute module configured to define artifact priority attributes based on historical artifact data and user input, and to define value categories for the artifact priority attributes. The platform also comprises a real-time weight adjustment software agent configured to assign adjustable weights to the artifact priority attributes and value categories. Additionally, the platform further comprises a priority routing module configured to calculate priority scores for pending artifacts as a function of all weights assigned to the artifact priority attributes and value categories, and to route the pending artifacts to resources in a ranked order of priority based on the priority scores.

16 Claims, 8 Drawing Sheets

102-M coupled via a network 104 to a processing platform 106.

PRIORITY-BASED ARTIFACT ROUTING

FIELD

The field relates generally to information processing systems, and more particularly to information technology (IT) routing techniques.

BACKGROUND

Information processing systems increasingly utilize reconfigurable virtual resources to meet changing user needs. For example, cloud computing and storage systems implemented using virtual machines have been widely adopted. Such cloud-based systems include, for example, Amazon Web Services (AWS), Google Cloud Platform (GCP), and Microsoft Azure. Despite the widespread availability of these and numerous other private, public and hybrid cloud offerings, there exists a significant problem in conventional practice in that there is no adequate mechanism available for substantively prioritizing service requests at the time of service request creation. Existing prioritization approaches are commonly limited to temporal parameters.

SUMMARY

Illustrative embodiments of the present invention provide information processing systems configured to provide priority-based artifact routing.

In one embodiment, an apparatus comprises a processing platform that includes a plurality of processing devices each comprising a processor coupled to a memory. The processing platform is configured to implement at least a portion of at least a first cloud-based system. The processing platform further comprises an artifact priority attribute module configured to define a set of artifact priority attributes based on historical artifact data and user input, wherein the artifact priority attributes comprise one or more temporally-based attributes and one or more non-temporally-based attributes, and to define value categories for the artifact priority attributes, wherein the value categories correspond to real-time status conditions of an artifact with respect to the artifact priority attributes. The processing platform also comprises a real-time weight adjustment software agent configured to assign adjustable weights to the artifact priority attributes and the value categories thereof, wherein the adjustable weights are based on real-time context information and one or more user preferences. Additionally, the processing platform further comprises a priority routing module configured to calculate priority scores for pending artifacts as a function of all weights assigned to the artifact priority attributes and the value categories thereof, and to route the pending artifacts to one or more resources in a ranked order of priority-based on the calculated priority scores.

Illustrative embodiments can provide significant advantages relative to conventional time-based artifact routing techniques. For example, challenges associated with the limitations of time-based routing are overcome through the use of weighted artifact priority attributes, such that the most impactful events and associated service requests are prioritized and contractual objectives are met. Such priority-based routing enables the ability of a business to influence the routing of artifacts and service requests based on real-time context information and strategic decision-making.

These and other illustrative embodiments described herein include, without limitation, methods, apparatus, systems, and computer program products comprising processor-readable storage media.

DETAILED DESCRIPTION

Illustrative embodiments of the present invention will be described herein with reference to exemplary information processing systems and associated computers, servers, storage devices and other processing devices. It is to be appreciated, however, that embodiments of the invention are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources. Numerous other system configurations are possible in other embodiments.

Figure 1:
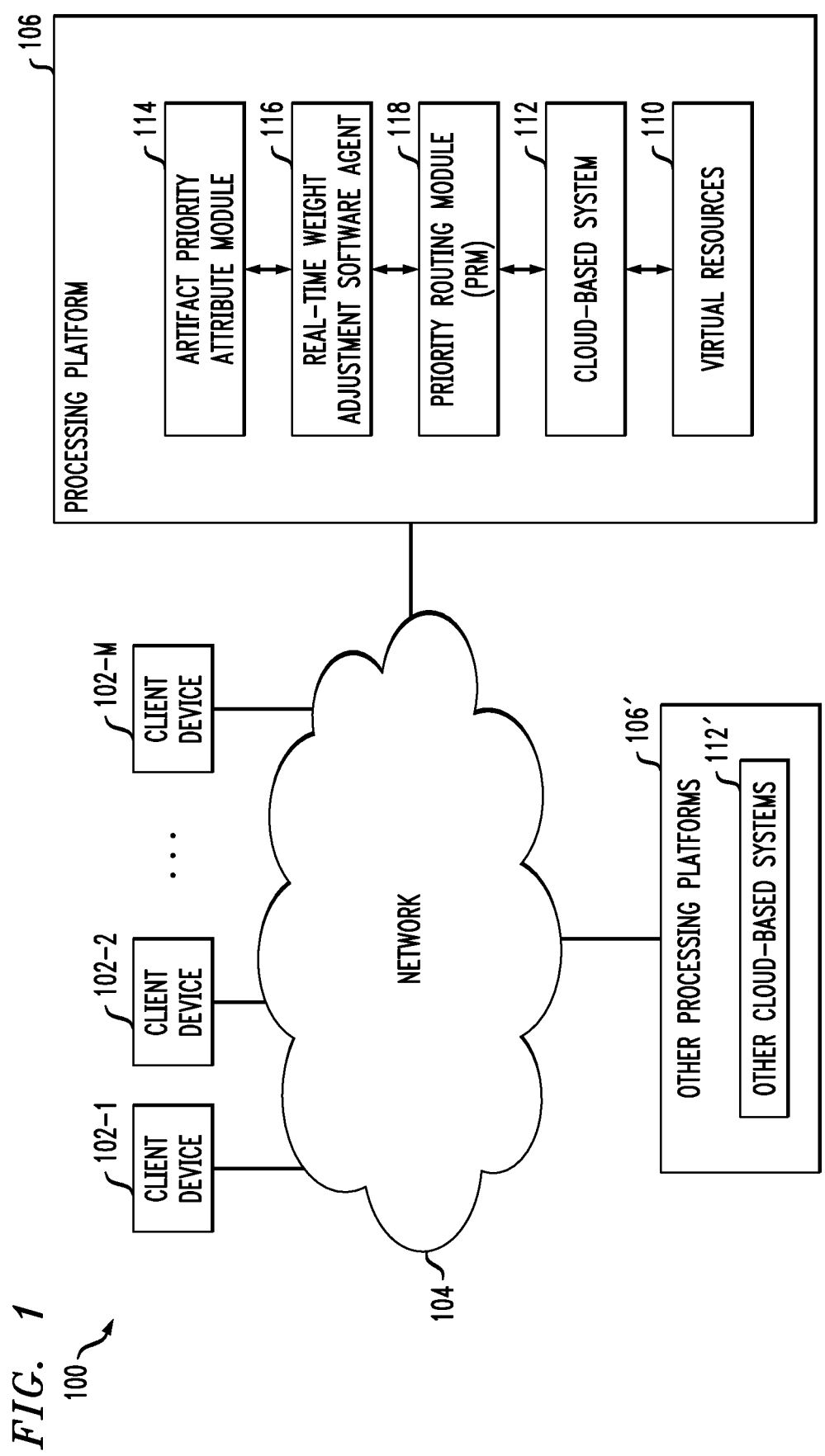
FIG. 1 is a block diagram of an information processing system configured for priority-based artifact routing in an illustrative embodiment.

FIG. 1 shows an information processing system 100 configured in accordance with an illustrative embodiment of the present invention. The information processing system 100 comprises a plurality of client devices 102-1, 102-2, . . . 102-M coupled via a network 104 to a processing platform 106.

The client devices 102 in this embodiment can comprise, for example, desktop, laptop or tablet computers, mobile telephones, or other types of processing devices capable of communicating with the processing platform 106 over the network 104. Clients associated with the respective client devices 102 are assumed to run respective sets of client applications utilizing corresponding sets of virtual resources 110 of at least one cloud-based system 112 provided by the processing platform 106. For example, such clients may be respective tenants of a cloud data center or other type of multi-tenant environment provided by the processing platform 106. These tenants or other clients are examples of what are more generally referred to herein as respective "users" of the processing platform 106. Such users are also intended to include customers of a cloud service provider.

In some embodiments, the virtual resources 110 comprise a plurality of containers allocable to respective client applications under the control of the cloud-based system 112. Additional or alternative virtual resources that may be used in a given embodiment include virtual machines. For example, the virtual resources may comprise a plurality of virtual machines allocable to respective ones of the client applications under the control of the cloud-based system 112. Various combinations of containers, virtual machines and other virtual resources may be used in other embodiments. For example, virtual resources may comprise containers running in virtual machines.

The network 104 over which the client devices 102 and the processing platform 106 communicate illustratively comprises one or more networks including, for example, a global computer network such as the Internet, a wide area network (WAN), a local area network (LAN), a satellite network, a telephone or cable network, a cellular network, a wireless network implemented using a wireless protocol such as Wi-Fi or WiMAX, or various portions or combinations of these and other types of communication networks.

The processing platform 106 is assumed to include a plurality of processing devices each having a processor coupled to a memory, and is configured to implement the virtual resources 110 of the cloud-based system 112 for use by client applications.

The processing platform 106 further comprises an artifact priority attribute module 114, a real-time weight adjustment software agent 116 and a priority routing module 118, each associated with the cloud-based system 112. The cloud-based system 112 is also referred to herein as simply a "cloud."

Examples of different types of clouds that may be utilized in illustrative embodiments include private, public and hybrid clouds. Private clouds illustratively include on-premises clouds and off-premises clouds, where "premises" refers generally to a particular site or other physical location of the business, enterprise, organization or other entity that utilizes the private cloud. Public clouds are assumed to be off-premises clouds. Hybrid clouds comprise combinations of public and private clouds and thus may include various combinations of on-premises and off-premises portions.

The artifact priority attribute module 114 is configured to define a set of artifact priority attributes based on historical artifact data and user input, wherein the artifact priority attributes comprise one or more temporally-based attributes and one or more non-temporally-based attributes, and to define value categories for the artifact priority attributes, wherein the value categories correspond to real-time status conditions of an artifact with respect to the artifact priority attributes. The real-time weight adjustment software agent 116 is configured to assign adjustable weights to the artifact priority attributes and the value categories thereof, wherein the adjustable weights are based on real-time context information and one or more user preferences. The priority routing module 118 is configured to calculate priority scores for pending artifacts as a function of all weights assigned to the artifact priority attributes and the value categories thereof, and to route the pending artifacts to one or more resources in a ranked order of priority based on the calculated priority scores.

An exemplary process utilizing artifact priority attribute module 114, real-time weight adjustment software agent 116, and priority routing module 118 of the processing platform 106 in information processing system 100 will be described in more detail with reference to the flow diagram of FIG. 8.

Also, by way of example, in some embodiments, a different cloud-based system comprises another cloud-based system implemented with cloud-based system 112 on the processing platform 106. Alternatively, the different cloud-based system can comprise another cloud-based system 112' implemented on a different processing platform 106' coupled to the network 104.

It is to be appreciated that the particular processing platform configuration illustrated in the FIG. 1 embodiment is presented by way of example only, and that other embodiments can utilize other arrangements of additional or alternative components. For example, functionality disclosed herein as being associated with two or more separate components can in other embodiments be combined into a single component.

A more particular example of an additional component that can be included in the processing platform 106 is a resource abstraction layer. Such a resource abstraction layer may be associated with the cloud-based system 112 and may comprise one or more resource abstraction frameworks such as a Mesos framework or a Cloud Foundry Diego framework. A given such framework can be configured to abstract away underlying virtual resources 110 from client applications that utilize those virtual resources.

As mentioned previously, the virtual resources 110 implemented by the processing platform 106 illustratively comprise containers. Such containers are more particularly assumed to comprise respective Docker containers or other types of Linux containers (LXCs). In embodiments that utilize containers, the processing platform 106 illustratively comprises a plurality of container host devices each implementing one or more of the containers. Each of the container host devices illustratively comprises at least one processor coupled to a memory. Such container host devices are examples of what are more generally referred to herein as "processing devices."

In some embodiments, Docker containers or other types of LXCs may be implemented on one or more Linux processing devices using Linux kernel control groups ("cgroups"). However, it is to be appreciated that embodiments of the present invention are not restricted to use with Docker containers or any other particular type of container. Accordingly, numerous other techniques can be used in implementing containers in a given embodiment, and such techniques do not necessarily require use of the Linux cgroup feature. Clusters of containers can be managed across multiple container host devices of the processing platform 106 using container cluster managers such as Docker Swarm or Kubernetes. Such cluster managers may be implemented within or in association with the cloud-based system 112.

The processing platform 106 can also incorporate one or more container engines, such as one or more Docker engines. By way of example, a given Docker engine may be preconfigured to run on CoreOS, an open source lightweight operating system based on the Linux kernel and particularly configured to provide functionality for deploying applications in containers. Another example of a lightweight operating system suitable for use in implementing at least portions of the processing platform 106 in some embodiments is VMware® Photon OS™ which has a relatively small footprint and is designed to boot extremely quickly on VMware® platforms.

The processing platform 106 in some embodiments incorporates additional functionality, such as management and orchestration functionality. The management and orchestration functionality may be implemented, for example, in the cloud-based system 112 or components thereof, and can be provided, for example, using components such as VCE Vision™ Intelligent Operations Software, or other types of management and orchestration components, including components from Pivotal Cloud Foundry, or various combinations of multiple ones of these or other components.

In some embodiments, certain functionality of the cloud-based system 112 is made available to a user by a cloud service provider on a Software-as-a-Service (SaaS) basis. Such users may be associated with respective ones of the client devices 102 and may correspond to respective tenants of the cloud service provider.

However, the term "user" in this context and elsewhere herein is intended to be more broadly construed so as to encompass, for example, human, hardware, software or firmware entities, as well as various combinations of such entities.

It should be understood that the particular arrangements of system and platform components as illustrated in FIG. 1 are presented by way of example only. In other embodiments, only subsets of these system and platform components, or additional or alternative sets of components, may be used, and such components may exhibit alternative functionality and configurations.

Examples of processing platforms that may be used to implement at least portions of the processing platform 106 of the FIG. 1 embodiment will be described in more detail below in conjunction with FIGS. 9 and 10. A given such processing platform comprises at least one processing device comprising a processor coupled to a memory, and the processing device may be implemented at least in part utilizing one or more virtual machines or other virtualization infrastructure. Additionally, the operation of the information processing system 100 will be described in further detail with reference to the flow diagram of FIG. 8.

As detailed herein, one or more embodiments of the invention include enabling a business user to define one or more artifact priority attributes (also referred to herein as predictors) and to assign a weight to each of those attributes. By way merely of example, in one or more embodiments of the invention (and as used as an illustrative embodiment herein), an artifact can include a service request (SR). Decision models can be implemented to arrive at the next best action, and dynamic work groups (also referred to herein as baskets) can be used for categorizing the artifact/work based on various categories.

By way merely of illustration, example SR attributes to be considered for priority-based routing can include a SR health gauge value, which represents a calculated value that takes into consideration severity, impact, customer type and customer temperature to provide a comprehensive view of SR health. As such, severity represents the level of customer business impact, impact represents the type of impact that the customer is facing, customer type represents the level of customer and expected service provided, and temperature represents technical service engineer (TSE) qualification of the customer's experience about the current issue.

Another example SR attribute includes service level objectives (SLOs), which describe the contractual timeframe for responding to submitted SRs. SLOs can be based, for example, on the support option and the assigned severity level of the SR. A turnover attribute represents the process used to transfer SR ownership and customer engagement to an engineer for ongoing analysis, monitoring, or customer follow-up to reduce impact on time-to-resolution and improve customer experience. Additionally, a field assist request attribute represents identification of field engineers dispatched and requests for assistance from a remote support team. Further, additional example SR attributes can include next customer contact (NCC), which describes the agreement made with the customer for a callback time, and hot account/product, which represents an account or product that has recently seen multiple or recurring issues in a concentrated period of time or requires increased attention based on strategic decisions. Also, example SR attributes can additionally include re-queue, which represents a change of SR ownership, and channel, which represents the method by which the SR was generated.

Accordingly, one or more embodiments of the invention can include, for example, defining priority of an SR based on one or more such attributes. In one such embodiment, an initial priority is calculated as a function of the weightages of all utilized attributes (for example, summing the weightages, taking an average across the attributes, etc.). Additionally, temporal and/or substantive milestones related to the particular SR can be considered in determining the SR priority. For example, when a goal of the SR is reached, one or more weightage values can be lessened to decrease the priority, and similarly, when a deadline and/or late intervals of the SR are reached, one or more weightage values can be increased to increase the priority. Accordingly, at least one embodiment of the invention enables organizations to build a dynamic prioritization model with a configurable set of attributes. Moreover, in one or more embodiments of the invention, SR goals, deadlines, and escalation actions (such as triggering a notification, routine to an exception queue, etc.) can be defined for a given SR and utilized in determining the SR priority.

In addition to artifact attributes, at least one embodiment can include generating and utilizing one or more TSE profile attributes to limit a pool of work with respect to pending and/or future artifacts. Such TSE profile attributes can include, for example, status as a designated support engineer (DSE), which represents a premium technical support offering that a customer can purchase as a supplement to priority support. DSEs can represent, for example, a designated support resource who provides personalized service by managing and overseeing all technical support activities related to a specified product line. Another TSE profile attribute can include, for example, the business unit and/or product group of a given TSE, which indicates that the TSE provides technical support aligned to the respective products or product suites.

An additional example TSE profile attribute can include a special handling attribute, which indicates that the given TSE can work on special handling SRs based on geography and/or additional variables. Also, a work type attribute represents the type of work that a given TSE is designated to support (such as, for example, chat only SRs, all SRs, etc.). A language attribute can also be considered, which indicates one or more language skills of a given TSE that enable the TSE to provide support for customers in a primary or secondary/local language to support one or more programs. Further, an elite level of support attribute can be considered, wherein elite customer care refers to a program that can include, for example, a suite of service offerings and capabilities designed to drive incremental loyalty and revenue within one or more targeted enterprise accounts.

Additionally, at least one embodiment of the invention can also include routing a given artifact (such as an SR) to a particular group of TSEs (also referred to herein as a work basket). Accordingly, work baskets can be based, for example, on different artifact or SR attributes. For instance, a business unit or a product group can be used as a filter for determining work baskets. Further, one or more embodiments of the invention can include align TSE profiles to work baskets.

Figure 2:
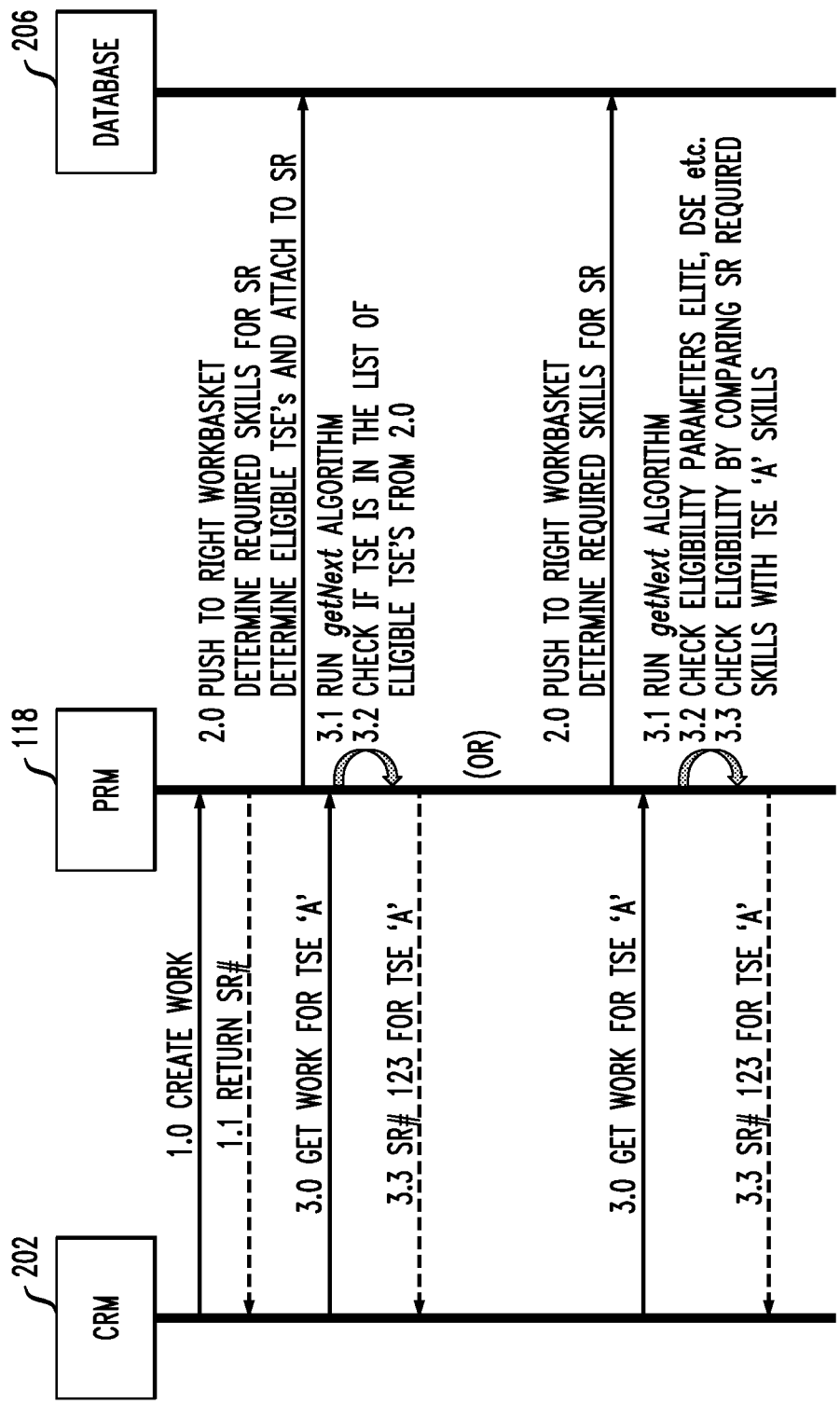
FIG. 2 shows an example work flow for checking eligibility of technical service engineers in an illustrative embodiment.

FIG. 2 shows an example work flow for checking eligibility of technical service engineers in an illustrative embodiment. By way of illustration, FIG. 2 depicts, in step 1.0, a customer relationship management (CRM) component 202 sends a "Create Work" request to the priority routing module (PRM) 118 of processing platform 106. In step 1.1, the PRM 118 returns an SR number to the CRM component 202, and in step 2.0, the PRM 118 pushes the SR associated with the SR number to the appropriate work basket in database 206. In carrying out step 2.0, the PRM 118 can determine the skills required to address the SR, and can also determine and/or identify eligible TSEs possessing the required skills, and attach the identified TSEs to the SR.

In step 3.0, the CRM component 202 sends to the PRM 118 a request to obtain work for a specific TSE (TSE 'A'). Subsequently, in step 3.1, the PRM 118 runs a getNext algorithm (which identifies the next one or more pending SRs), and in step 3.2, the PRM 118 determines if TSE 'A' is on the list of eligible TSEs (per step 2.0) for any of the identified SRs. In step 3.3 (and after affirmatively addressing step 3.2), the PRM 118 sends the relevant identified SR numbers (SR #123) to the CRM component 202, in a ranked order of priority, for handling by TSE 'A'.

The version of step 2.0 through step 3.3 described above can be considered as a case creation iteration. An additional version of step 2.0 through step 3.3 is also depicted in FIG. 2, wherein this additional version can be considered a run-time iteration.

Accordingly, in step 2.0 of the additional version illustrated in FIG. 2, the PRM 118 pushes the SR associated with the SR number to the appropriate work basket in database 206. In carrying out this version of step 2.0, the PRM 118 can also determine the skills required to address the SR.

In step 3.0 of this additional version, the CRM component 202 again sends to the PRM 118 a request to obtain work for TSE 'A'. Subsequently, in step 3.1, the PRM 118 again runs a getNext algorithm (which identifies the next one or more pending SRs), and in step 3.2, the PRM 118 determines one or more TSE eligibility attributes and/or parameters associated with the identified SRs. In step 3.3 of this additional version, the PRM 118 checks TSE 'A' eligibility by comparing the skills required by the SRs and the skills attributed to TSE 'A' before ultimately sending the SR numbers for the identified relevant SRs (SR #123) to the CRM component 202, in a ranked order or priority, for handling by TSE 'A'.

Figure 3:
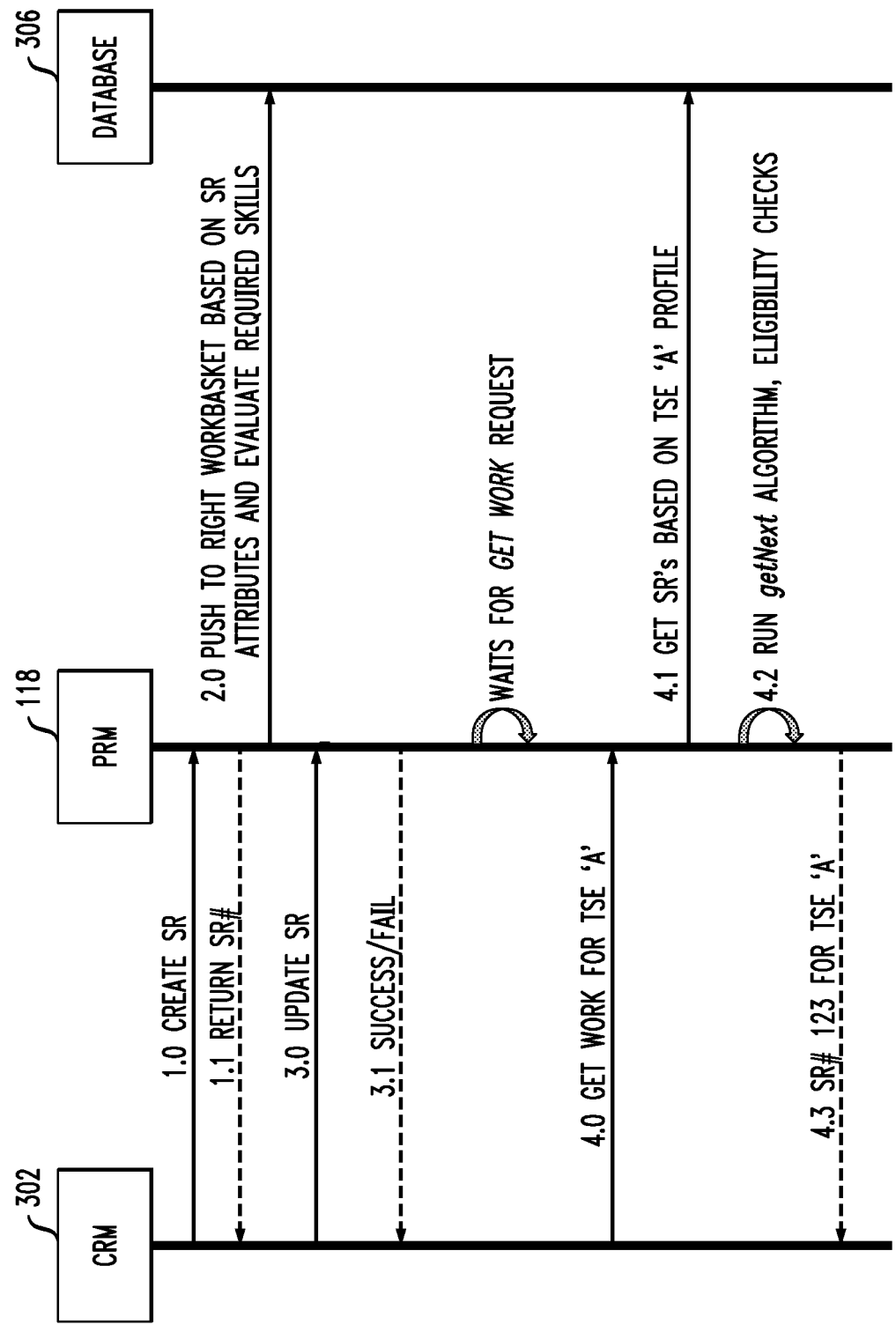
FIG. 3 shows an example work flow for priority-based routing in an illustrative embodiment.

FIG. 3 shows an example work flow for priority-based routing in an illustrative embodiment. By way of illustration, FIG. 3 depicts, in step 1.0, a CRM component 302 sends a "Create SR" request to the PRM 118 of processing platform 106. In step 1.1, the PRM 118 returns an SR number to the CRM component 302, and in step 2.0, the PRM 118 pushes the SR associated with the SR number to the appropriate work basket in database 306 based on the SR attributes and the evaluated skills required by the SR.

In step 3.0, the CRM component 302 sends to the PRM 118 a request to update an SR by adding activity notes to the SR or by changing the assignments to the SR, and in step 3.1, the PRM 118 returns a success or failure (between the systems interfacing with each other) notification to that request. Additionally, as depicted in FIG. 3, at this time, the PRM 118 can wait for a specific "Get Work" request from the CRM component 302. In step 4.0, the CRM component 302 sends to the PRM 118 a "Get Work" request for a specific TSE (TSE 'A'), and in step 4.1, the PRM 118 obtains, from the database 306, one or more SRs based on the profile of TSE 'A'. In step 4.2, the PRM 118 runs a getNext algorithm (which identifies the next one or more pending SRs) in connection with an eligibility check, and in step 4.3, the PRM 118 sends relevant identified SR numbers (SR #123) to the CRM component 302, in a ranked order of priority, for handling by TSE 'A'.

Figure 4:
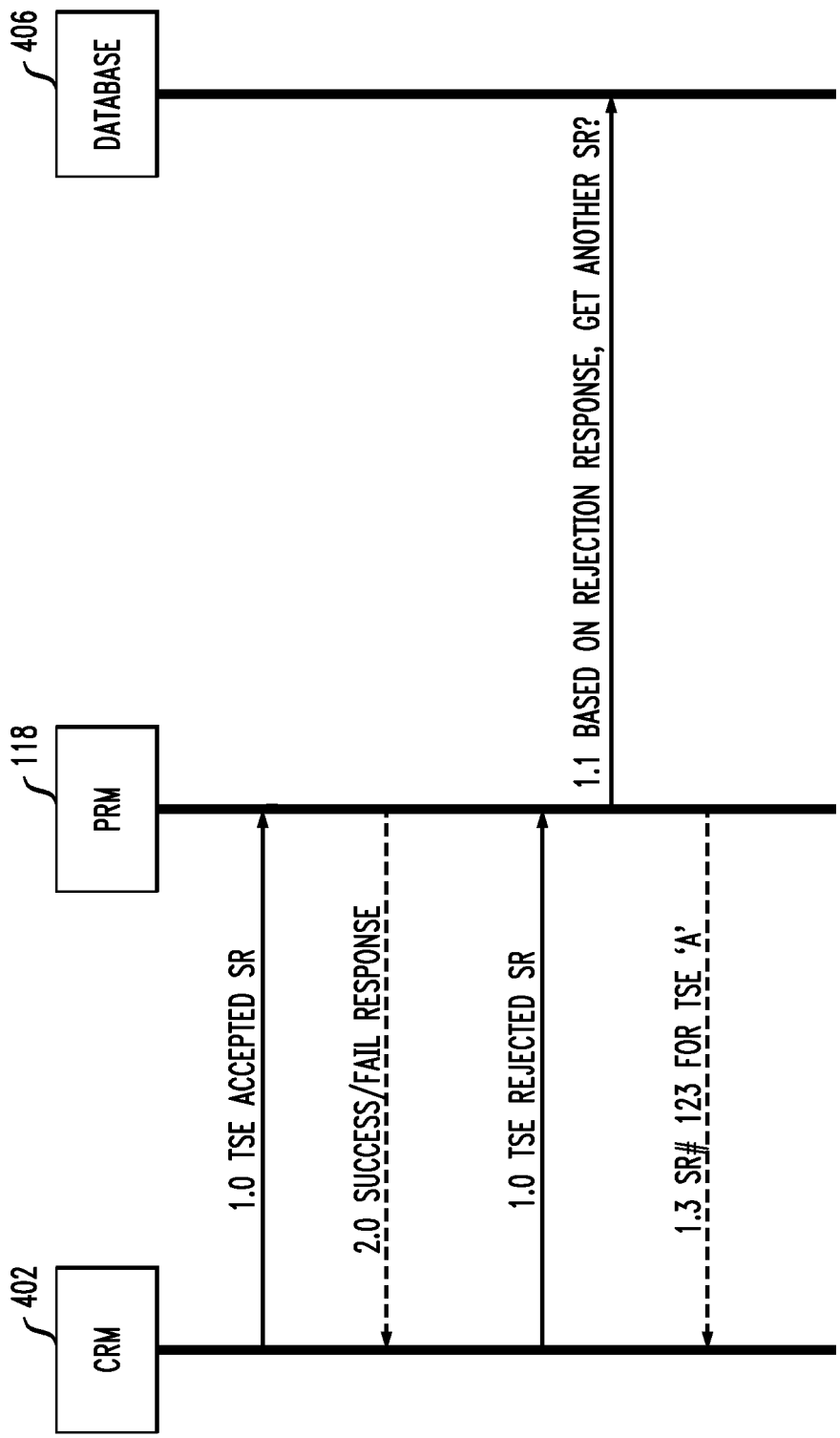
FIG. 4 shows an example work flow for priority-based routing in an illustrative embodiment.

FIG. 4 shows an example work flow for priority-based routing in an illustrative embodiment. In step 1.0, the CRM component 402 sends the PRM 118 an indication that TSE 'A' accepted at least one of a set of provided SRs, and in step 2.0, the PRM 118 returns a success or failure notification (depending on whether the request made to the target system is successfully received or not) to that request. Additionally, as also part of step 1.0, the CRM component 402 sends the PRM 118 an indication that TSE 'A' rejected at least one of a set of provided SRs. Based on this received rejection, in step 1.1, the PRM 118 determines whether one or more additional SRs can be identified (from database 406) and sent to TSE 'A' via the CRM component 402. If yes, then step 1.3 includes the PRM 118 sending relevant identified SR numbers to the CRM component 402, in a ranked order of priority, for handling by TSE 'A'.

Figure 5:
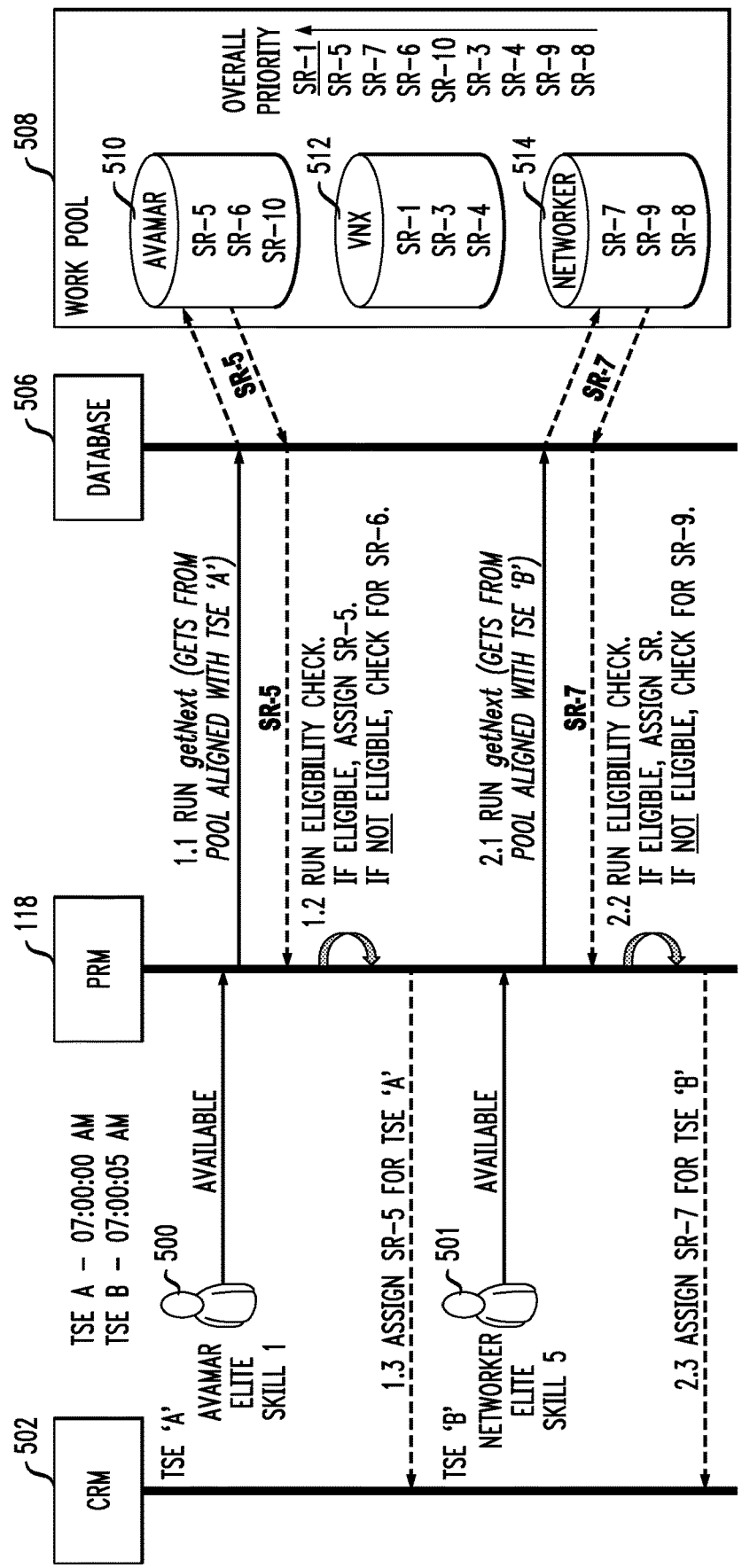
FIG. 5 shows an example priority-based service request routing work flow in an illustrative embodiment.

FIG. 5 shows an example priority-based service request routing work flow in an illustrative embodiment. By way of illustration, FIG. 5 depicts a CRM component 502, the PRM 118, a database 506, and a work pool module 508 that includes work pool databases 510, 512 and 514. FIG. 5 also depicts TSE 'A' 500 and TSE 'B' 501, wherein (for the purposes of the example embodiment illustrated in FIG. 5) TSE 'A' 500 has engaged the PRM 118 at an earlier point in time than TSE 501. As specifically depicted in FIG. 5, in step 1.1, the PRM 118 runs a getNext algorithm, which identifies the next one or more pending SRs from a work pool that is aligned with TSE 'A' 500 from work pool database 510. In response, a particular SR (SR-5) is obtained from work pool database 510 and provided to the PRM 118. In step 1.2, the PRM 118 runs an eligibility check to determine if TSE 'A' 500 is eligible to handle SR-5. If TSE 'A' 500 is eligible, SR-5 is assigned to TSE 'A' 500 in step 1.3. If TSE 'A' 500 is ineligible, then the PRM 118 will perform an eligibility check in connection with the next SR from work pool database 510 (SR-6).

As additionally depicted in FIG. 5, in step 2.1, the PRM 118 runs a getNext algorithm, which identifies the next one or more pending SRs from a work pool that is aligned with TSE 'B' 501 from work pool database 514. In response, a particular SR (SR-7) is obtained from work pool database 514 and provided to the PRM 118. In step 2.2, the PRM 118 runs an eligibility check to determine if TSE 'B' 501 is eligible to handle SR-7. If TSE 'B' 501 is eligible, SR-7 is assigned to TSE 'B' 501 in step 2.3. If TSE 'B' 501 is ineligible, then the PRM 118 will perform an eligibility check in connection with the next SR from work pool database 514 (SR-9).

Additionally, one or more embodiments of the invention can include implementing a feedback loop that utilizes user/customer feedback in subsequent iterations.

Figure 6:
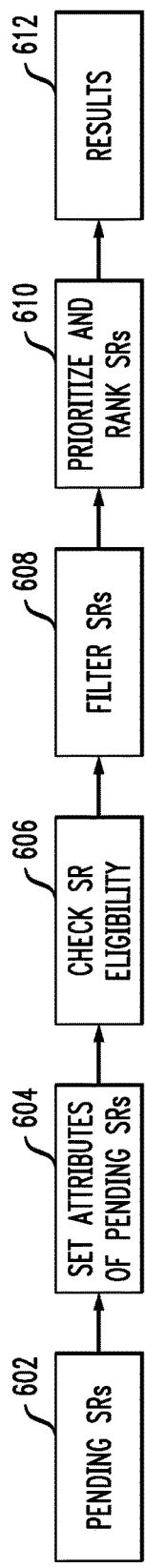
FIG. 6 shows a flow diagram of a process for prioritizing a group of pending service requests in an illustrative embodiment.

FIG. 6 shows a flow diagram of a process for prioritizing a group of pending service requests in an illustrative embodiment. By way of illustration, FIG. 6 depicts a set of pending SRs 602, which are used to determine and set related SR attributes 604. Based on the attributes 604, one or more embodiments of the invention can include checking SR eligibility for handling in step 606. Additionally, step 608 includes filtering the eligible SRs, and step 610 includes prioritizing and ranking the remaining SRs post-filtering. The output of such actions in step 610 are then provided as results 612.

Figure 7:
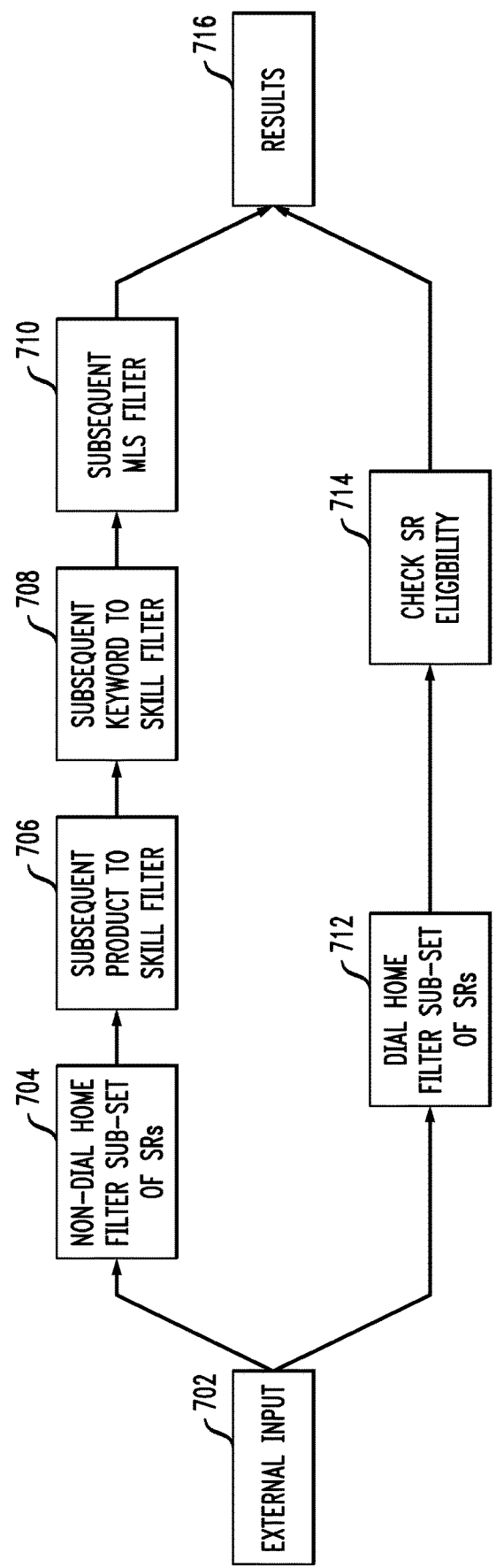
FIG. 7 shows a flow diagram of a process for filtering artifacts in connection with priority-based routing in an illustrative embodiment.

FIG. 7 shows a flow diagram of a process for filtering artifacts in connection with priority-based routing in an illustrative embodiment. By way of illustration, FIG. 7 depicts an external input 702, to which a non-dial home filter is applied in step 704 and a dial home filter is applied in step 712. As used herein, dial homes are homes that contain a certain amount of enterprise devices/products. In such a home, faults can be identified by the devices/products pro-actively and the error details sent to a remote support site, in turn creating an incident or an SR that can be automatically processed. The resulting sub-set of SRs from step 712 is checked for handling eligibility in step 714, and the results of such an analysis is provided as a part of results 716. The resulting sub-set of SRs from step 704 are additionally filtered with a product to skill filter in step 706, a keyword to skill filter in step 708, and a multi-language support (MLS) filter in step 710. The results of such analyses are provided as a part of results 716.

As noted herein, the operation of the information processing system 100 is described in further detail with reference to the flow diagram of the example embodiment of FIG. 8. The process as shown includes steps 800 through 812, and is suitable for use in the system 100 but is more generally applicable to other systems comprising a processing platform having cloud infrastructure representation functionality. Accordingly, references to components of the embodiment of FIG. 1 in the process description below should not be viewed as limiting in any way, as the disclosed process steps can be applied in a wide variety of other types of information processing systems.

In step 800, at least one processing platform is configured to include a plurality of processing devices each comprising a processor coupled to a memory. In the context of the FIG. 1 embodiment, information processing system 100 comprises multiple processing platforms 106 and 106' as illustrated in the figure. The one or more additional processing platforms 106' may be configured in substantially the same manner as the processing platform 106. Each such processing platform comprises virtual resources for use by client applications.

In step 802, at least a portion of at least a first cloud-based system are implemented within the processing platform. For example, with reference to the FIG. 1 embodiment, virtual resources 110 of cloud-based system 112 are implemented within the processing platform 106. As mentioned previously, such virtual resources illustratively comprise containers, virtual machines or combinations thereof. For example, in the context of the FIG. 1 embodiment, the virtual resources may comprise a plurality of containers allocable to respective client applications of the client devices 102 under the control of the cloud-based system 112. As another example, the virtual resources may comprise a plurality of virtual machines allocable to respective ones of the client applications of the client devices 102 under the control of the cloud-based system 112. Numerous other arrangements of virtual resources of various types and combinations can be utilized in other embodiments. For example, the virtual resources can include a plurality of virtual machines and a plurality of containers configured to run on at least a subset of the virtual machines.

In step 804, a set of artifact priority attributes based on historical artifact data and user input is defined, wherein the artifact priority attributes comprise one or more temporally-based attributes and one or more non-temporally-based attributes. Such a step can be carried out, for example, by artifact priority attribute module 114 in the FIG. 1 embodiment. In at least one embodiment of the invention, the set of artifact priority attributes can include a level of business impact associated with an artifact, a type of impact associated with an artifact, a type of customer associated with an artifact, a level of expected service associated with an artifact, a qualification of a customer's experience pertaining to an artifact, a response timeframe associated with an artifact, an expected number of resources associated with supporting an artifact, a number of recurring issues associated with an artifact, and/or a method by which an artifact was generated.

In step 806, value categories for the artifact priority attributes are defined, wherein the value categories correspond to real-time status conditions of an artifact with respect to the artifact priority attributes. Such a step can be carried out, for example, by artifact priority attribute module 114 in the FIG. 1 embodiment.

In step 808, adjustable weights are assigned to the artifact priority attributes and the value categories thereof, wherein the adjustable weights are based on real-time context information and one or more user preferences. Such a step can be carried out, for example, by real-time weight adjustment software agent 116 in the FIG. 1 embodiment. In at least one embodiment of the invention, the real-time weight adjustment software agent can be further configured to modify the adjustable weights assigned to the artifact priority attributes and the value categories thereof based on at least one of updated real-time context information and one or more updated user preferences.

In step 810, priority scores are calculated for pending artifacts as a function of all weights assigned to the artifact priority attributes and the value categories thereof. Such a step can be carried out, for example, by priority routing module 118 in the FIG. 1 embodiment. In one or more embodiments of the invention, the pending artifacts can include pending service requests.

In step 812, the pending artifacts are routed to one or more resources in a ranked order of priority based on the calculated priority scores. Such a step can be carried out, for example, by priority routing module 118 in the FIG. 1 embodiment. In one or more embodiments of the invention, the one or more resources can include one or more technical service engineers.

Additionally, at least one embodiment of the invention can also include a resource filtering module configured to partition a collection of resources into multiple resource groups based on one or more resource attributes. In such an embodiment, the one or more resource attributes can include a support level associated with a resource, a business unit associated with a resource, a product group associated with a resource, geographic location of a resource, one or more artifact types that a resource is designated to support, and/or one or more language skills associated with a resource. Also, in such an embodiment, the priority routing module can be further configured to determine, for each of the pending artifacts, an appropriate one of the multiple resource groups to route the pending artifact. Further, the priority routing module can be further configured to route the pending artifacts to one or more resources, within the appropriate resource groups, in a ranked order of priority based on the calculated priority scores.

Further in at least one embodiment of the invention, the priority routing module is further configured to calculate updated priority scores for the pending artifacts as a function of all modified weights assigned to the artifact priority attributes and the value categories thereof, and to re-route the pending artifacts to one or more resources in a ranked order of priority based on the calculated updated priority scores.

Figure 8:
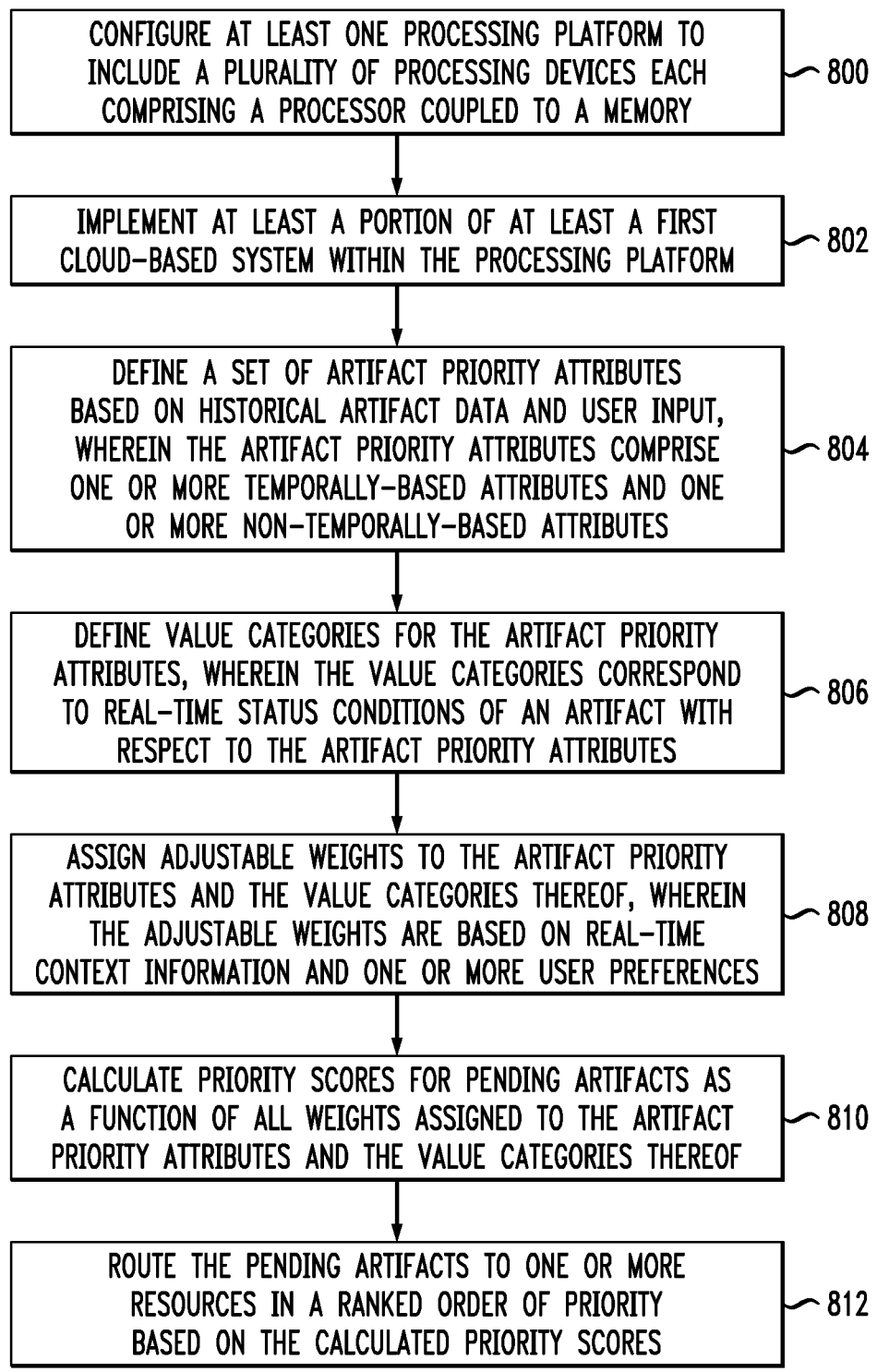
FIG. 8 is a flow diagram of a process for priority-based artifact routing in an illustrative embodiment.

The particular processing operations and other system functionality described in conjunction with the flow diagram of FIG. 8 are therefore presented by way of illustrative example only, and should not be construed as limiting the scope of the disclosure in any way. Alternative embodiments can use other types of processing operations involving cloud infrastructure representation. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another in order to carry out the techniques of one or more embodiments of the invention detailed herein.

Functionality such as that described in conjunction with the flow diagram of FIG. 8 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

Illustrative embodiments of priority-based routing as disclosed herein can provide a number of significant advantages relative to conventional arrangements.

For example, some embodiments can advantageously sort work requests based on technical service engineer and additionally rank those work requests based on priority. Such arrangements overcome the difficulties that would otherwise be associated with time-based prioritization techniques.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As mentioned previously, at least portions of the information processing system 100 may be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform that may be used to implement at least a portion of an information processing system comprise a cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components, or portions thereof, are illustratively implemented for use by tenants of such a multi-tenant environment.

As mentioned previously, cloud infrastructure as disclosed herein can include cloud-based systems such as AWS, GCP and Microsoft Azure. Virtual machines provided in such systems can be used to implement at least portions of one or more of a computer system and a content addressable storage system in illustrative embodiments. These and other cloud-based systems in illustrative embodiments can include object stores such as Amazon S3, GCP Cloud Storage, and Microsoft Azure Blob Storage.

In some embodiments, the cloud infrastructure additionally or alternatively comprises a plurality of containers implemented using container host devices. For example, as detailed herein, a given container of cloud infrastructure illustratively comprises a Docker container or other type of LXC. The containers may run on virtual machines in a multi-tenant environment, although other arrangements are possible. The containers may be utilized to implement a variety of different types of functionality within the system 100. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIGS. 9 and 10. Although described in the context of system 100, these platforms may also be used to implement at least portions of other information processing systems in other embodiments.

Figure 9:
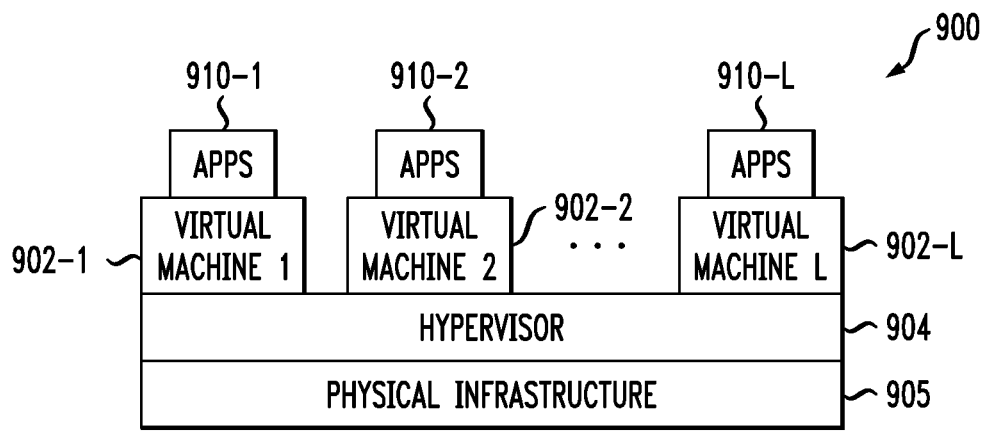
FIGS. 9 and 10 show examples of processing platforms that may be utilized to implement at least a portion of an information processing system in illustrative embodiments.
Figure 10:
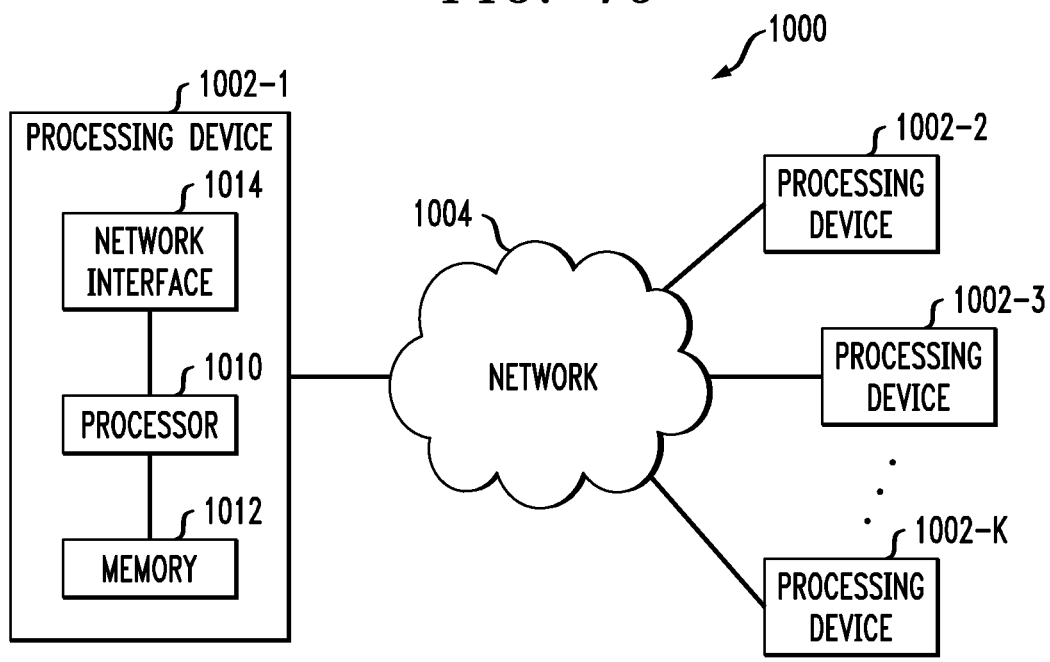

FIG. 9 shows an example processing platform comprising cloud infrastructure 900. The cloud infrastructure 900 comprises a combination of physical and virtual processing resources that may be utilized to implement at least a portion of the information processing system 100. The cloud infrastructure 900 comprises virtual machines (VMs) 902-1, 902-2, . . . 902-L implemented using a hypervisor 904. The hypervisor 904 runs on physical infrastructure 905. The cloud infrastructure 900 further comprises sets of applications 910-1, 910-2, . . . 910-L running on respective ones of the virtual machines 902-1, 902-2, . . . 902-L under the control of the hypervisor 904.

Although only a single hypervisor 904 is shown in the embodiment of FIG. 9, the system 100 may of course include multiple hypervisors each providing a set of virtual machines using at least one underlying physical machine. Different sets of virtual machines provided by one or more hypervisors may be utilized in configuring multiple instances of various components of the system 100.

An example of a commercially available hypervisor platform that may be used to implement hypervisor 904 and possibly other portions of the information processing system 100 in one or more embodiments is the VMware® vSphere® which may have an associated virtual infrastructure management system such as the VMware® vCenter™. The underlying physical machines may comprise one or more distributed processing platforms that include one or more storage systems.

As is apparent from the above, one or more of the processing modules or other components of system 100 may each run on a computer, server, storage device or other processing platform element. A given such element may be viewed as an example of what is more generally referred to herein as a "processing device." The cloud infrastructure 900 shown in FIG. 9 may represent at least a portion of one processing platform. Another example of such a processing platform is processing platform 1000 shown in FIG. 10.

The processing platform 1000 in this embodiment comprises a portion of system 100 and includes a plurality of processing devices, denoted 1002-1, 1002-2, 1002-3, . . . 1002-K, which communicate with one another over a network 1004.

The network 1004 may comprise any type of network, including by way of example a global computer network such as the Internet, a WAN, a LAN, a satellite network, a telephone or cable network, a cellular network, a wireless network such as a Wi-Fi or WiMAX network, or various portions or combinations of these and other types of networks.

The processing device 1002-1 in the processing platform 1000 comprises a processor 1010 coupled to a memory 1012.

The processor 1010 may comprise a microprocessor, a microcontroller, an application-specific integrated circuit (ASIC), a field-programmable gate array (FPGA) or other type of processing circuitry, as well as portions or combinations of such circuitry elements.

The memory 1012 may comprise random access memory (RAM), read-only memory (ROM) or other types of memory, in any combination. The memory 1012 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1002-1 is network interface circuitry 1014, which is used to interface the processing device with the network 1004 and other system components, and may comprise conventional transceivers.

The other processing devices 1002 of the processing platform 1000 are assumed to be configured in a manner similar to that shown for processing device 1002-1 in the figure.

Again, the particular processing platform 1000 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxBlock™, or Vblock® converged infrastructure commercially available from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage products or devices, or other components are possible in the information processing system 100. Such components can communicate with other elements of the information processing system 100 over any type of network or other communication media.

For example, particular types of storage products that can be used in implementing a given storage system of a distributed processing system in an illustrative embodiment include VNX® and Symmetrix VMAX® storage arrays, software-defined storage products such as ScaleIO198 and ViPR®, all-flash and hybrid flash storage arrays such as Unity™, cloud storage products such as Elastic Cloud Storage (ECS), object-based storage products such as Atmos®, scale-out all-flash storage arrays such as XtremIO™, and scale-out NAS clusters comprising Isilon® platform nodes and associated accelerators, all from Dell EMC. Combinations of multiple ones of these and other storage products can also be used in implementing a given storage system in an illustrative embodiment.

It should again be emphasized that the above-described embodiments are presented for purposes of illustration only. Many variations and other alternative embodiments may be used. For example, the disclosed techniques are applicable to a wide variety of other types of information processing systems in which it is desirable to provide priority-based artifact routing. Also, the particular configurations of system and device elements and associated processing operations illustratively shown in the drawings can be varied in other embodiments. Thus, for example, the particular types of processing platforms, modules, cloud-based systems and virtual resources deployed in a given embodiment and their respective configurations may be varied. Moreover, the various assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. An apparatus comprising:
at least one processing platform comprising a plurality of processing devices each comprising a processor coupled to a memory;
the processing platform being configured to implement at least a portion of at least a first cloud-based system;
wherein the processing platform further comprises:
an artifact priority attribute module configured:
to define a set of artifact priority attributes based on historical artifact data and user input, wherein the artifact priority attributes comprise one or more temporally-based attributes and one or more non-temporally-based attributes; and
to define value categories for the artifact priority attributes, wherein the value categories correspond to real-time status conditions of an artifact with respect to the artifact priority attributes;
a real-time weight adjustment software agent configured to assign adjustable weights to the artifact priority attributes and the value categories thereof, wherein the adjustable weights are based on real-time context information and one or more user preferences;
a resource filtering module configured:
to partition a collection of resources into multiple resource groups based on one or more resource attributes; and
a priority routing module configured:
to calculate priority scores for pending artifacts as a function of all weights assigned to the artifact priority attributes and the value categories thereof;
to determine, for each of the pending artifacts, an appropriate one of the multiple resource groups to route the pending artifact; and
to route the pending artifacts to one or more of the resources, within the appropriate resource groups, in a ranked order of priority based on the calculated priority scores.

2. The apparatus of claim 1, wherein the pending artifacts comprise pending service requests.

3. The apparatus of claim 1, wherein the one or more resources comprise one or more technical service engineers.

4. The apparatus of claim 1, wherein the one or more resource attributes comprises at least one of a support level associated with a resource, a business unit associated with a resource, a product group associated with a resource, geographic location of a resource, one or more artifact types that a resource is designated to support, and one or more language skills associated with a resource.

5. The apparatus of claim 1, wherein the set of artifact priority attributes comprises at least one of a level of business impact associated with an artifact, a type of impact associated with an artifact, a type of customer associated with an artifact, a level of expected service associated with an artifact, a qualification of a customer's experience pertaining to an artifact, a response timeframe associated with an artifact, an expected number of resources associated with supporting an artifact, a number of recurring issues associated with an artifact, and a method by which an artifact was generated.

6. The apparatus of claim 1, wherein the real-time weight adjustment software agent is further configured to modify the adjustable weights assigned to the artifact priority attributes and the value categories thereof based on at least one of updated real-time context information and one or more updated user preferences.

7. The apparatus of claim 6, wherein the priority routing module is further configured:
to calculate updated priority scores for the pending artifacts as a function of all modified weights assigned to the artifact priority attributes and the value categories thereof.

8. A method comprising:
defining a set of artifact priority attributes based on historical artifact data and user input, wherein the artifact priority attributes comprise one or more temporally-based attributes and one or more non-temporally-based attributes;
defining value categories for the artifact priority attributes, wherein the value categories correspond to real-time status conditions of an artifact with respect to the artifact priority attributes;
assigning adjustable weights to the artifact priority attributes and the value categories thereof, wherein the adjustable weights are based on real-time context information and one or more user preferences;
calculating priority scores for pending artifacts as a function of all weights assigned to the artifact priority attributes and the value categories thereof;
partitioning a collection of resources into multiple resource groups based on one or more resource attributes;
determining, for each of the pending artifacts, an appropriate one of the multiple resource groups to route the pending artifact; and
routing the pending artifacts to one or more of the resources, within the determined appropriate resource groups, in a ranked order of priority based on the calculated priority scores;
wherein the defining, assigning, calculating and routing steps are implemented in at least one processing platform configured to include a plurality of processing devices each comprising a processor coupled to a memory; and
wherein the processing platform is configured to implement at least a portion of at least the first cloud-based system.

9. The method of claim 8, further comprising:
modifying the adjustable weights assigned to the artifact priority attributes and the value categories thereof based on at least one of updated real-time context information and one or more updated user preferences.

10. A computer program product comprising a non-transitory processor-readable storage medium having stored therein program code of one or more software programs, wherein the program code when executed by a processing platform comprising a plurality of processing devices causes the processing platform:
to define a set of artifact priority attributes based on historical artifact data and user input, wherein the artifact priority attributes comprise one or more temporally-based attributes and one or more non-temporally-based attributes;
to define value categories for the artifact priority attributes, wherein the value categories correspond to real-time status conditions of an artifact with respect to the artifact priority attributes;
to assign adjustable weights to the artifact priority attributes and the value categories thereof, wherein the adjustable weights are based on real-time context information and one or more user preferences;

to calculate priority scores for pending artifacts as a function of all weights assigned to the artifact priority attributes and the value categories thereof;

to partition a collection of resources into multiple resource groups based on one or more resource attributes;

to determine, for each of the pending artifacts, an appropriate one of the multiple resource groups to route the pending artifact; and to route the pending artifacts to one or more of the resources, within the determined appropriate resource groups, in a ranked order of priority based on the calculated priority scores;

wherein the processing platform is configured to implement at least a portion of at least the first cloud-based system.

11. The computer program product of claim 10, wherein the program code further causes the processing platform:

to modify the adjustable weights assigned to the artifact priority attributes and the value categories thereof based on at least one of updated real-time context information and one or more updated user preferences.

12. The apparatus of claim 7, wherein the priority routing module is further configured:

to re-route the pending artifacts to one or more resources in a ranked order of priority based on the calculated updated priority scores.

13. The method of claim 9, further comprising:

calculating updated priority scores for the pending artifacts as a function of all modified weights assigned to the artifact priority attributes and the value categories thereof.

14. The method of claim 13, further comprising:

re-routing the pending artifacts to one or more resources in a ranked order of priority based on the calculated updated priority scores.

15. The computer program product of claim 11, wherein the program code further causes the processing platform:

to calculate updated priority scores for the pending artifacts as a function of all modified weights assigned to the artifact priority attributes and the value categories thereof.

16. The computer program product of claim 15, wherein the program code further causes the processing platform:

to re-route the pending artifacts to one or more resources in a ranked order of priority based on the calculated updated priority scores.

* * * * *